United States Patent [19]

Hake

[11] Patent Number: 5,335,735
[45] Date of Patent: Aug. 9, 1994

[54] CULTIVATOR SHANK ASSEMBLY WITH CAMMED SHANK END RECEIVER

[75] Inventor: Kenneth A. Hake, Tipton, Kans.

[73] Assignee: Kent Manufacturing Co., Inc., Tipton, Kans.

[21] Appl. No.: 900,314

[22] Filed: Jun. 18, 1992

Related U.S. Application Data

[63] Continuation-in-part of Ser. No. 602,629, Oct. 24, 1990, Pat. No. 5,133,415.

[51] Int. Cl.$^5$ .............................................. A01B 23/00
[52] U.S. Cl. .................................. 172/707; 172/709; 172/773; 172/753; 403/374; 403/409.1
[58] Field of Search ........................ 172/705, 707–709, 172/711, 753, 762, 773, 775, 763; 403/263, 374, 375, 209, 374, 409.1

[56] References Cited

U.S. PATENT DOCUMENTS

| 224,722 | 2/1880 | Peer . |
| 322,351 | 7/1885 | Cook . |
| 465,173 | 12/1891 | Farquhar et al. . |
| 845,255 | 2/1907 | Omberg . |
| 1,185,498 | 5/1916 | Gooding . |
| 1,636,048 | 7/1927 | Drefke . |
| 1,838,355 | 12/1931 | Benjamin . |
| 2,259,890 | 10/1941 | Hipple . |
| 2,806,336 | 9/1957 | Anderson . |
| 2,884,081 | 4/1959 | Weber . |
| 3,225,840 | 12/1965 | Andersen ............................ 172/708 |
| 3,827,505 | 8/1974 | Sosalla . |
| 3,896,883 | 7/1975 | Howes . |
| 3,921,726 | 11/1975 | Connor et al. . |
| 3,921,727 | 11/1975 | Anderson et al. . |
| 4,011,915 | 3/1977 | Anderson . |
| 4,050,524 | 9/1977 | Hake . |
| 4,079,790 | 3/1978 | Guttler . |
| 4,334,714 | 6/1982 | Gargrave ........................ 403/409.1 |
| 4,452,320 | 6/1984 | Meiners . |
| 4,453,602 | 6/1984 | Larsen et al. ........................ 172/707 |
| 4,465,396 | 8/1984 | Meinert et al. . |
| 5,076,370 | 12/1991 | Stubben et al. .................... 403/374 |
| 5,133,415 | 7/1992 | Hake ................................. 172/708 |

FOREIGN PATENT DOCUMENTS

| 20686 | 6/1930 | Australia . |
| 40509 | 2/1929 | Denmark . |
| 1120197 | 12/1961 | Fed. Rep. of Germany ...... 172/708 |
| 1159203 | 12/1963 | Fed. Rep. of Germany ...... 172/708 |
| 2352262 | 6/1975 | Fed. Rep. of Germany . |

OTHER PUBLICATIONS

Kent, "Two Piece K-Flex Shank Option", Sep. 1989.

*Primary Examiner*—Randolph A. Reese
*Assistant Examiner*—Spencer Warnick
*Attorney, Agent, or Firm*—Litman, McMahon & Brown

[57] ABSTRACT

A shank assembly for mounting on a tool bar of a farm implement includes an upper shank section having a lower portion with a generally transverse slot near a distal end thereof and a lower section having an upper portion. The lower portion of the upper section includes a slot adapted to receive the upper portion of the lower section. A ground working tool is fixedly attached to a lower extremity of the lower section. The slot has end walls formed into at least one cam surface which urges the ground working tool into simultaneous contact with both endwalls of the slot thereby locking the lower portion and the upper portion together against lateral motion in the slot.

5 Claims, 3 Drawing Sheets

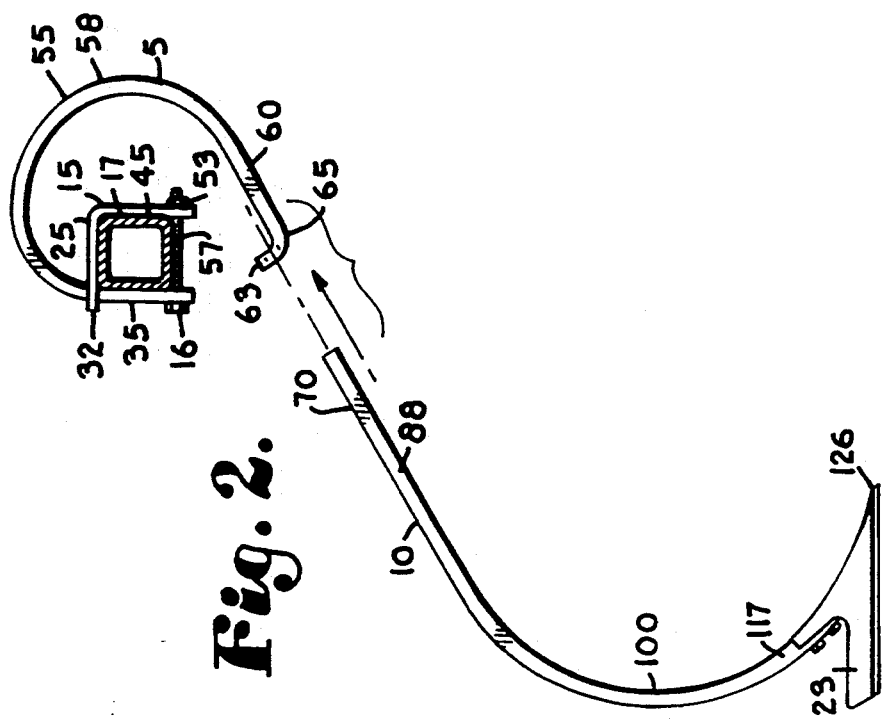
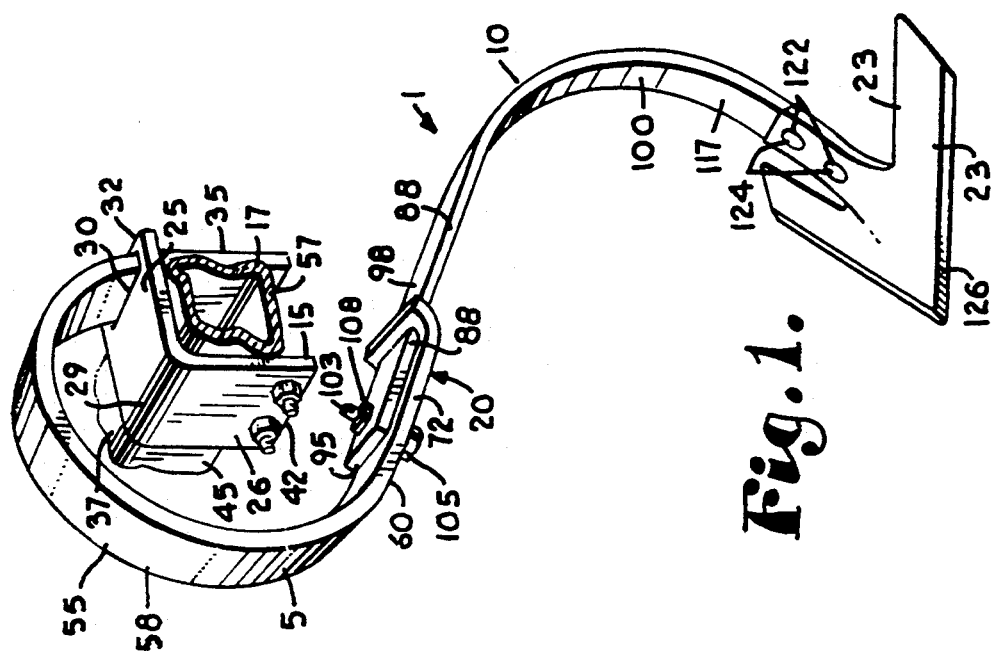

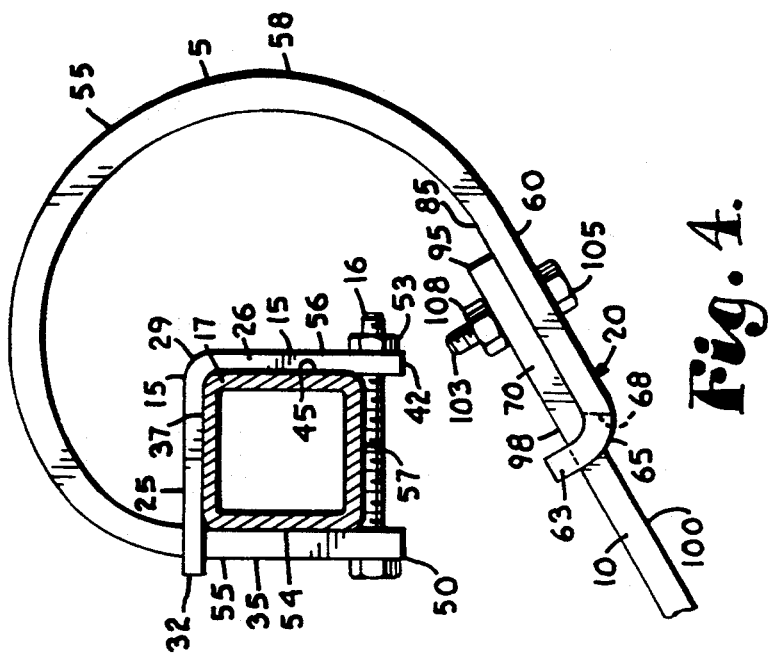
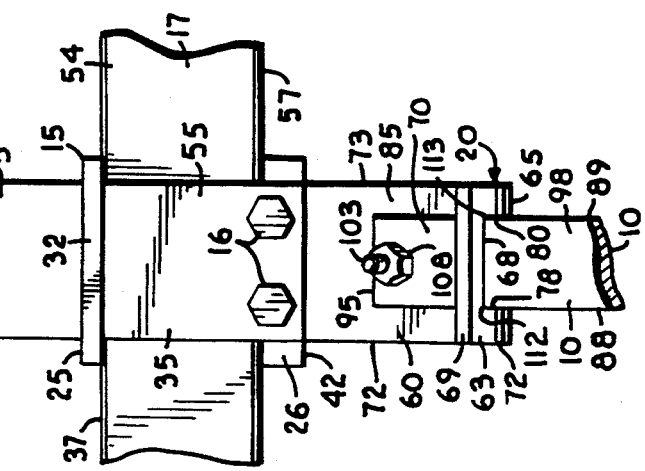
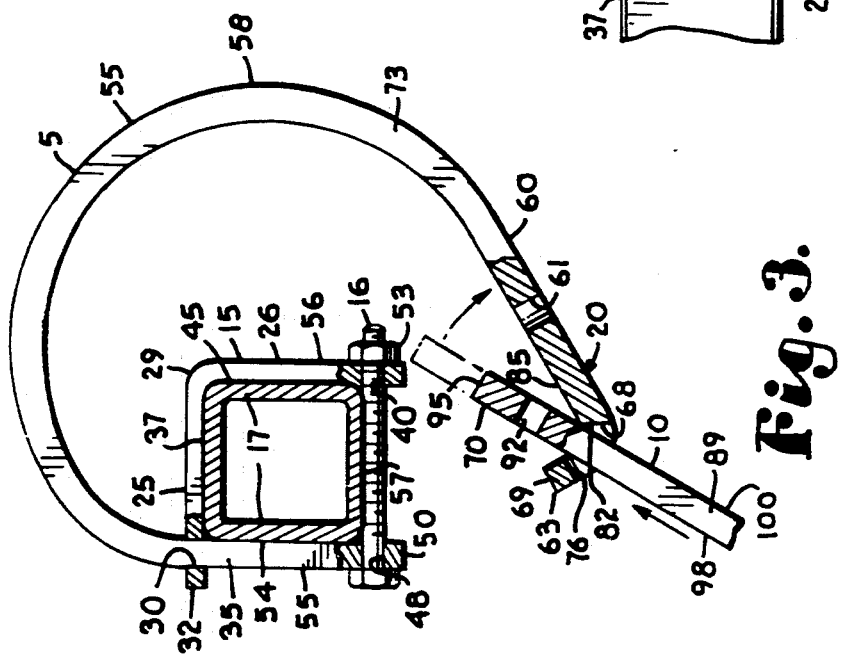

CULTIVATOR SHANK ASSEMBLY WITH CAMMED SHANK END RECEIVER

CROSS-REFERENCE TO RELATED APPLICATION

This application is a Continuation-In-Part of application Ser. No. 07/602,629 filed Oct. 24, 1990 now U.S. Pat. No. 5,133,415.

BACKGROUND OF THE INVENTION

The present invention relates to agricultural cultivating tools and, more particularly, to a two-piece cultivator shank assembly.

For many years, cultivator shanks called "spring teeth" have been utilized for soil cultivation. In general, a spring tooth is a rigid, generally flat, curved shank to which a soil-working tool, such as a shovel, may be fixedly attached to a bottom end thereof. Such a shank is usually rigidly mounted on a tool bar of a farm implement. When the bottom of the shank encounters an obstruction, such as a rock or root, the shank resiliently deflects.

Spring teeth shanks presently utilized are typically of one-piece construction and produce adequate results under ideal working conditions. However, obstacles are often encountered that either break a spring tooth shank or bend the shank to such an extent that the shank is damaged and does not spring back into position, requiring either removal or repair of the shank so that the soil may be adequately cultivated. Conventional spring teeth also tend to fracture at the mounting end thereof, thus, there is a need for additional strength at the mounting end of each spring tooth shank.

The prior art includes shanks that are of two-ply construction, resulting in a thick shank having greater total strength than a single-ply shank but having the disadvantage of being heavier than traditional shanks and, therefore, less likely to easily trip out of the ground when an obstruction is encountered. Shanks have also been devised to include various shapes and curves at an upper portion near the mounting end thereof, providing adequate flexibility when an obstruction is confronted. However, if such shanks are broken or bent after an encounter with a substantial object, the entire shank, including the upper formed portion, must be replaced or repaired.

SUMMARY OF THE INVENTION

A cultivator shank assembly of the invention disclosed in this application is of two-piece construction having a first section firmly mounted to a tool bar of a farm implement and a second section fixedly attached to the first section at one end thereof and to a ground engaging tool at another end thereof. The first section is wider than the second section, providing strength and durability to the assembly at the mounting end where it is most needed. If a substantial obstacle is encountered by the assembly, the second, narrower section is more likely to break or bend, reducing the likelihood of damage to the first section. The second, narrower section is inexpensive to manufacture and may be easily removed and replaced if broken or damaged during use.

The first section includes a slot located near an end thereof through which a leg of the second section extends. The leg overlaps the first section and is attached thereto by a bolt and nut. The overlapping first and second sections also provide strength to the assembly.

The slot in the first section is intended to closely receive the leg of the second section. It has been found that any lateral motion allowed between the first and second sections due to side play within the slot, sometimes causes the nut to tighten on the threads of the bolt in a ratcheting action, ultimately resulting in overstressing the bolt to the extent that it fails in tensile load, whereupon the second section is released.

An improved embodiment of the cultivator shank assembly eliminates the possibility of such side play by providing the slot with side camming surfaces which simultaneously contact the side edges of the second section and thereby prevent relative lateral motion within the slot. The slot endwalls, which form the camming surfaces, function to pre-stress overlapping ends of the first and second sections as they are fixedly secured together by the initial tightening of the nut and bolt.

OBJECTS AND ADVANTAGES OF THE INVENTION

Therefore, the objects of the present invention are: to provide a cultivator shank assembly wherein an upper mount section includes a slot through which an upper leg of the lower section extends with the slot receiving the lower section, and the slot being configured to prevent lateral movement of the lower section with respect to the upper mount section; to provide such an assembly wherein said upper mount section slot forms cams which lock the sections together against relative lateral motion during use; to provide such an assembly whereby relative movement between abutting portions of the upper section and the lower section is prevented without substantially inhibiting ease of assembly; to provide such an assembly whereby relative lateral movement between abutting portions of the upper section and the lower section is eliminated in order to prevent ratchet induced over-tightening and failure of an interconnecting bolt and nut; and to provide such an assembly that is relatively easy to use, inexpensive to construct and particularly well adapted for its intended usage.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary perspective view of a cultivator shank assembly according to the present invention, including an upper section and a detachable lower section with the upper section shown mounted on a tool bar and the lower section shown attached to an earth working tool.

FIG. 2 is an exploded, side elevational view of the shank assembly of FIG. 1 with the lower section shown in position for entry into a slot formed in the upper section.

FIG. 3 is a fragmentary, side elevational view of the shank assembly, on a larger scale, shown with the lower section inserted through the slot but otherwise, detached from, the upper section.

FIG. 4 is a fragmentary, side elevational view similar to FIG. 3 but shown with the lower section secured to the upper section by a nut and bolt.

FIG. 5 is a fragmentary, rear elevational view of the shank assembly showing further details of the mounting arrangement between the upper and lower sections.

DETAILED DESCRIPTION OF THE INVENTION

Figure 6:
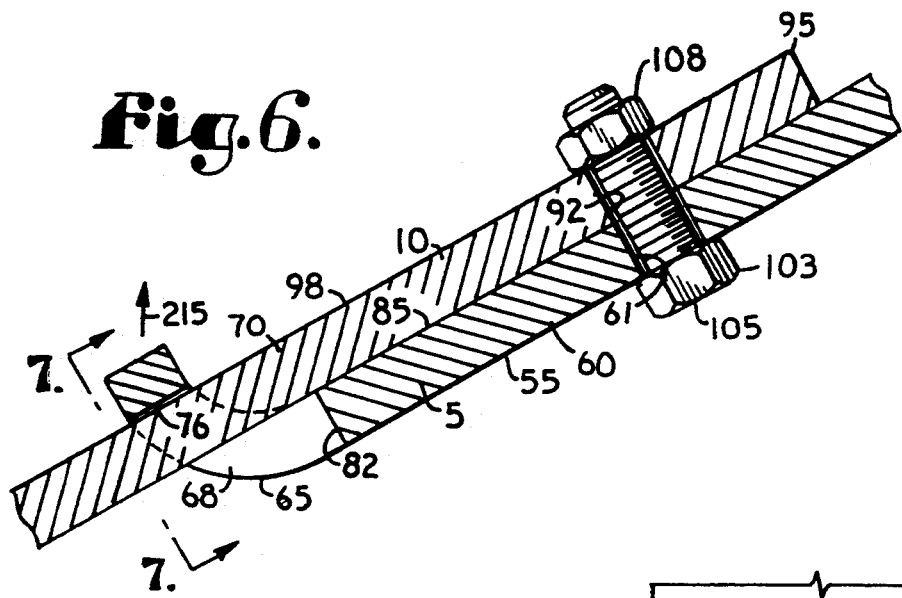
FIG. 6 is a fragmentary, vertical cross-sectional view of the shank assembly, on an enlarged scale, shown with the lower section secured to the upper section.
Figure 9:
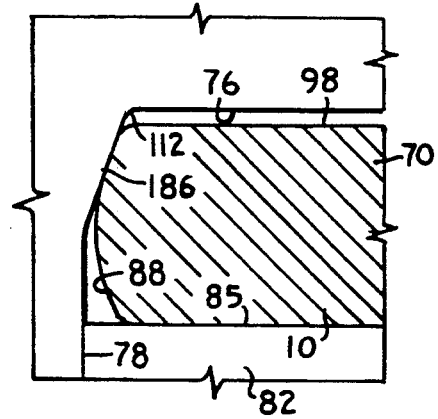
FIG. 9 is a fragmentary end elevational view of the shank assembly, on a still further enlarged scale, showing the camming relationship in further detail.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, a cultivator shank assembly of this invention, generally designated by the reference numeral 1, includes an upper or first section 5; a lower or second section 10 and clamping means in the form of an L-shaped bracket or clamp 15 with bolt 16, for mounting the assembly 1 on a tool bar 17 that constitutes a transverse mounting member of a conventional farm implement frame (not shown). Fastening means between the section 5 and 10 utilize an overlapping assembly generally designated by the reference numeral 20. A ground engaging tool, for example, a shovel 23, is secured to the second section 10.

The L-shaped bracket 15 has planar legs 25 and 26 joined at bend 29 in a right dihedral angle. Leg 25 has an elongated rectangular aperture or slot 30 located near and generally parallel to an edge 32. The slot 30 is sized to closely receive therethrough a straight planar portion 35 of the first section 5. The slot 30 is spaced from the bend 29 a distance slightly greater than the length of a top side 37 of the tool bar 17.

Leg 26 has a pair of spaced bolt-receiving apertures 40 located near an edge 42. The apertures 40 are spaced from the bend 29 a distance slightly greater than the height of a forward side 45 of the tool bar 17.

The portion 35 of first section 5 also has a pair of spaced bolt-receiving apertures 48 located near an edge 50. The portion 35 extends through the slot 30 and is adjacent to a rearward side 54 of tool bar 17. The heads of the bolts 16 abut against an outer flat surface 55 of the portion 35 and the bolts 16 extend through the apertures 40 and 48 and are secured by nuts 53 that abut against an outer flat surface 56 of the leg 26. The bolts 16 are adjacent to a bottom side 57 of the tool bar 17. The portion 35, the legs 25 and 26, and the bolts 16 surround and fit snugly about the tool bar 17, holding the section 5 in place against the side 54 and prohibit any rotational or lateral movement of the portion 35 of the section 5 during use of the assembly 1.

It is foreseen that other types of clamping means may be utilized to fixedly attach or clamp the portion 35 of the section 5 to the tool bar 17 without departing from this invention.

The first section 5 is a generally flat, rectangular piece of relatively constant cross-section that extends upwardly from the tool bar 17 at the portion 35 and is formed into a generally C-shaped portion 58 arching in a forward direction about the tool bar 17 and extending downwardly and rearwardly to a generally straight portion 60 located generally below the tool bar 17 and slightly forwardly therefrom. The portion 60 has a bolt-receiving aperture 61 located centrally therein.

An end piece 63, integral with the straight portion 60, is formed by a bend 65 in the section 5. The end piece 63 generally projects upwardly and rearwardly from the portion 60, in this example, at an angle slightly greater than ninety degrees.

The section 5 includes an elongated slot 68 located at the bend 65. The slot 68 is located generally transversely to the length of the section 5, is generally parallel to edge 69, and is sized to easily receive therethrough a generally straight, planar upper portion or leg 70 of the second section 10.

The slot 68 is spaced centrally in the bend 65 between edges 72 and 73 of the section 5. The slot 68, in this example, is bounded by generally planar upper surface 76, side surface 78, side surface 80 and bottom surface 82 of the section 5. The surface 76 is generally parallel to a flat, inner planar surface 85 of the portion 60 and roughly perpendicular to the surfaces 78 and 80. The surfaces 78 and 80 are generally parallel, except as detailed below and are sized in the lower portions to readily receive edges 88 and 89 of the upper leg 70 of the second section 10. The surface 82 is generally perpendicular to the surfaces 78 and 80 and is spaced from the surface 76 to provide adequate space for extending the upper leg 70 through the slot 68.

The lower or second section 10 is also made of a generally flat, rectangular piece of roughly constant cross-section but of narrower width than the section 5, allowing the section 10 to fit within the slot 68 of the section 5. Both of the sections 5 and 10 are made from appropriate spring steel by conventional forming techniques.

The upper leg 70 of the section 10 has a bolt-receiving aperture 92 located near an edge 95 thereof that extends between a flat upper surface 98 and a flat lower surface 100 of the section 10. The upper leg 70, together with the aperture 92 and the portion 60 of the section 5, together with the aperture 61 and the elongate slot 68, make up the overlapping fastening assembly generally designated by reference numeral 20.

When the upper leg 70 is inserted in the slot 68, it is longitudinally adjusted so that the apertures 61 and 92 are aligned, and a bolt 103 is passed therethrough with a head 105 of the bolt 103, in this example, abutting against the flat surface 55 of the portion 60 of the section 5. A nut 108 is secured to the bolt 103 and, in this example, abuts the surface 98 of the upper leg 70 of the section 10. The surface 98 of the leg 70 moves toward, but preferably does not quite abut the surface 76 when the bolt 103 and the nut 108 secure an upper portion of the leg 70 to the section 5. The resistance toward full abutment is detailed below.

Corners 112 and 113 formed by the intersection of the surface 76 with the surfaces 78 and 80, respectively, are slightly rounded to reduce stresses otherwise present due to sharp corners under separating forces.

The leg 70 of the section 10 extends downwardly and rearwardly from the section 5 and the tool bar 17. The section 10 then curves downwardly and forwardly from the leg 70 to a position below and slightly behind the tool bar 17. A lower, forwardly-extending portion 117 of the section 10 includes two bolt-receiving apertures 122 for alignment with two bolt-receiving apertures (not shown) of the shovel 23. Bolts 124 and nuts 125 secure the shovel 23 to the lower portion 117 with a shovel point 126 facing in a forward direction. It is foreseen that different types of ground-engaging tools may be secured to the lower portion 117.

In normal use, the shank assembly 1, as shown assembled in FIG. 1, is pulled through the soil with the point 126 of the shovel 23 in front. The sections 5 and 10 flex slightly due to the pull of soil about the shovel 23. When an obstacle is encountered, the assembly 1 deflects upwardly or slightly to either side. If the obstacle is large or otherwise substantial, the wider, stronger upper section 5 is adapted to remain intact with the narrower, less expensive lower section 10 more likely to stress and either break or bend.

If the lower section 10 is damaged, the nut 108 is loosened and removed from the bolt 103 and the bolt 103 is removed from the assembly 1. The upper leg 70 of the section 10 is then slid in a rearward direction through the slot 68 in the section 5. The section 10 may either be repaired or a new one of the sections 10 may be acquired and slid forwardly through the slot 68 and fixedly attached to the section 5 by placing the bolt 103 through the apertures 61 and 92 and securing the section 10 to the section 5 with the nut 108 screwed onto the bolt 103.

The slot 68 is spaced generally centrally in the bend 65 between edges 72 and 73 of the first shank section 5. The upper slot surface 76 is inclined at a small acute angle to the flat, planar surface 85 of the leg 70 as the leg 70 is fixedly secured as described. The slot side surfaces 78 and 80 are spaced apart sufficiently such that adequate space is provided for extending the leg 70 through the slot 68.

Figure 7:
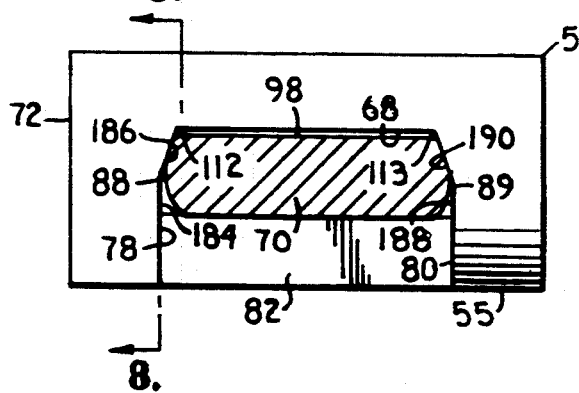
FIG. 7 is a fragmentary, end elevational view of the first modified shank assembly, on a further enlarged scale, taken along line 7—7 of FIG. 6.
Figure 8:
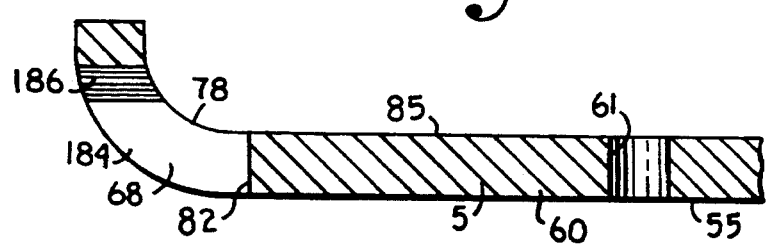
FIG. 8 is a fragmentary, vertical cross-sectional view of the shank assembly taken along line 8—8 of FIG. 7.

The slot sidewall surfaces 78 and 80 respectively have non-camming lower portions 184 and 188. The side surfaces 78 and 80 further have upper or camming surfaces 186 and 190. The camming surfaces 186 and 190 taper inwardly toward each other, as shown in FIG. 7 and as hereinafter described. Shank sidewalls 88 and 89 have, in this example, slightly convex profiles, as shown FIG. 7. The first and second shank sections and are generally constructed from spring steel by conventional forming techniques.

The first and second camming surfaces 186 and 190 are configured whereby the surface 186 is in contact with the shank sidewall 88 and the second surface 190 is in contact with the shank sidewall 89, and the surface 98 is separated from or only in light contact with the slot surface 76 as the leg 70 is fixedly secured, as shown in FIGS. 6 and 7.

As the leg 70 is inserted through the slot 68, the leg 70 is placed in close proximity to the straight portion 60 of the first shank section 5 and adjusted with respect to each other so that the apertures 92 and 61 are aligned. A bolt 103, preferably having close tolerances with the apertures 92 and 61, is then passed therethrough with a head 105 abutting against the flat surface 98. The nut 108 is secured to the bolt 103 and abuts the lower surface of the straight portion 60.

As the leg 70 is drawn into contact with the portion 60 by the bolt 103 and nut 108, the end piece 63 of the section 5 is forced generally upwardly, as indicated by the arrow designated by the numeral 215 in FIG. 6, flexing the bend 65 and thereby pre-stressing the leg 70 and the straight portion 60 between the cam surfaces 186 and 190 such that fictional forces therebetween are greatly enhanced. The primary consideration for providing such pre-stressing is to positively lock the leg 70 and portion 60 against lateral relative motion in the slot 68 during the substantial operating stress to which the assembly is subjected during use.

The primary consideration for this arrangement, which prevents such relative motion, is to avoid the observed phenomena whereby the bolt 103 and the nut 108 become overtightened, with subsequent pull-apart failure of the bolt 103.

It is to be understood that while certain forms of the present invention have been illustrated and described herein, it is not to be limited to the specific forms or arrangement of parts described and shown, except insofar as such limitations are included in the following claims.

What is claimed and desired to be secured by Letters Patent is as follows:

1. A shank assembly for attaching a ground-engaging tool to a tool bar of an agricultural implement, comprising:
   (a) an upper shank section having a mounting portion adapted to be secured to the tool bar and a lower portion;
   (b) a lower shank section having a distal end, adapted to be secured to the too, and an upper portion with upper and lower generally flat, generally parallel, surfaces and generally convex sidewalls extending therebetween;
   (c) a bolt and nut adapted to cooperatively secure said lower section upper portion to said upper section lower portion; and
   (d) camming means including an integral slot for camming said upper section lower portion as said upper section lower portion is secured to said lower section upper portion such that lateral movement of said lower portion relative to said upper portion is prevented as the tool engages the ground, thereby preventing overtightening of said bolt and said nut during use of said assembly.

2. A shank assembly for attaching a ground-engaging tool to a tool bar of an agricultural implement, comprising:
   (a) a lower shank section having an upper portion with upper and lower generally flat, generally parallel, surfaces and generally convex sidewalls extending therebetween;
   (b) an upper shank section having a lower portion with an integral slot near a distal end thereof; said slot having opposing slot endwalls, said slot adapted to receive said upper portion of said lower shank section and to cam said upper portion into simultaneous lateral contact between said sidewalls and said slot endwalls as said upper portion is secured to said lower portion.

3. A shank assembly for mounting a ground-engaging tool to a tool bar of an agricultural implement, comprising:

(a) a lower shank section having a tool attaching portion and an upper portion with upper and lower generally flat, generally parallel, surfaces and generally convex sidewalls extending therebetween;

(b) an upper shank section having a mounting portion and a lower portion; and (c) pre-stressing means including an integral slot for engaging said sidewalls and pre-stressing said upper portion of said lower shank section and said lower portion of said upper shank section to prevent relative lateral motion therebetween as said upper and lower portions are secured together.

4. In an agricultural ground-engaging assembly:

(a) means for forming an integral shank receiving slot, said slot having end walls, and a shank having a flat upper surface and generally convex sidewalls;

(b) at least one of said end walls having a cam surface contacting and engaging one of said shank sidewalls and urging said shank against the other of said end walls, thereby locking said shank against lateral motion in said slot.

5. The shank assembly according to claim 4, wherein:

(a) said assembly includes a bolt and a nut which, when tightened, urges said shank into said cam surface contacting condition.

* * * * *

UNITED STATES PATENT AND TRADEMARK OFFICE
CERTIFICATE OF CORRECTION

PATENT NO. : 5,335,735
DATED : August 9, 1994
INVENTOR(S) : Kenneth A. Hake

It is certified that error appears in the above-identified patent and that said Letters Patent is hereby corrected as shown below:

Claim 1, column 6, line 36, delete "too" and insert --tool--.

Signed and Sealed this

Fourth Day of July, 1995

*Attest:*

*Attesting Officer*

BRUCE LEHMAN

*Commissioner of Patents and Trademarks*